United States Patent [19]
Kitagawa et al.

[11] Patent Number: 4,563,393

[45] Date of Patent: Jan. 7, 1986

[54] LAMINATE OF POLYVINYLIDENE FLUORIDE BONDED TO THERMOPLASTIC RESIN

[75] Inventors: Yozo Kitagawa, Kamagaya; Akinori Nishioka, Yokkaichi; Yasuo Higuchi, Ageo; Tadahiko Tsutsumi, Suzuka; Takashi Yamaguchi; Tadashi Kato, both of Yokkaichi, all of Japan

[73] Assignee: Japan Synthetic Rubber Co., Ltd., Tokyo, Japan

[21] Appl. No.: 694,682

[22] Filed: Jan. 25, 1985

[30] Foreign Application Priority Data

Feb. 1, 1984 [JP] Japan .................................. 59-15020
Jun. 5, 1984 [JP] Japan ................................ 59-113852

[51] Int. Cl.$^4$ ............................................. B32B 27/00
[52] U.S. Cl. .................................. 428/412; 428/421; 428/422; 428/520; 428/521
[58] Field of Search ............... 428/412, 421, 422, 520, 428/522

[56] References Cited

U.S. PATENT DOCUMENTS 4,444,826  4/1984  Sasaki et al. ........................ 428/422

*Primary Examiner*—Marion C. McCamish
*Attorney, Agent, or Firm*—Oblon, Fisher, Spivak, McClelland & Maier

[57] ABSTRACT

A laminate consisting essentially of a layer of a thermoplastic resin (A) and a layer of a vinylidene fluoride resin (B), the layer of the resin (A) containing (C) polymerized units of an ethylenic unsaturated carboxylic acid ester in a proportion of 3 to 80% by weight based on the total weight of the layer of the resin (A). The polymerized units (C) of an ethylenic unsaturated carboxylic acid ester may exist either as a copolymer constituent of the resin (A) or in the form of an ethylenic unsaturated carboxylic acid ester polymer (C') blended in the layer of the resin (A).

21 Claims, No Drawings

LAMINATE OF POLYVINYLIDENE FLUORIDE BONDED TO THERMOPLASTIC RESIN

This invention relates to a laminate consisting essentially of a thermoplastic resin and a vinylidene fluoride resin.

Among the thermoplastic resins, polycarbonate resin, polyacetal resin, polyphenylene ether resin, polyamide resin, polyurethane resin, polyester resin and the like are called "engineering plastics" and have excellent properties. Therefore, they are widely used as a material for industrial parts which are required to have a wide functionability, parts which require a high durability, and other various commercial products.

Aromatic alkenyl type thermoplastic resins and chlorine-containing thermoplastic resins are typical examples of other thermoplastic resins than the enginering plastics.

Among the chlorine-containing thermoplastic resins, there are widely known polyvinyl chloride, chlorinated vinyl chloride resin, ethylene-vinyl chloride copolymer resin, chlorinated polyethylene, vinyl chloride-vinyl acetate copolymer and the like. These resins have the common advantages that they are flame retardant, relatively excellent in weather resistance, capable of giving moldings having a beautiful surface and relatively low in cost, and therefore, they are widely utilized.

As the aromatic alkenyl type thermoplastic resins, there are widely known polystyrene resin, styrene-acrylonitrile copolymer resin, high-impact polystyrene resin, ABS resin, EPDM-styrene-acrylonitrile graft copolymer (AES resin) and the like. The common advantages of these resins are that they are excellent in molding flowability, the surface of a molded article is beautiful, they are relatively low in cost, and high impact polystyrene resins modified with a rubber, ABS resins, AES resins, etc. are excellent in impact resistance, and for these advantages, said resins are also used widely.

The common disadvantage of these resins is that although they show an excellent chemical resistance to certain specific types of chemicals and solvents, they do not show excellent resistance to a large variety of chemicals and chemical preparations. It is also well known that in long-term use of the products made of these resins in the outdoor, the product surface tends to be cracked, which is a cause of breakage and discoloration, such an article also tends to be soiled, and the soiled part is difficult to remove.

Thus, the scope of use of these thermoplastic resins has been limited inspite of their excellent properties.

For improving the chemical resistance of these thermoplastic resins, it is widely known to add a resin having excellent chemical resistance. This method is capable of providing a certain degree of improvement, but this degree is still not sufficient. In addition, there is a risk of impairing the excellent properties of the thermoplastic resin. For the improvement of weather resistance, it has been proposed to add an ultraviolet absorber or to blend an inorganic pigment having excellent weather resistance in large quantities. These methods are effective in use for a short period of time, but unable to maintain the effect for a long period of time. Vinyl chloride resin, for instance, is often used as a sash material especially in Europe and America and also used for troughs and roofing. However, as is well known, these articles made of a vinyl chloride resin suffer from deterioration with the lapse of time and are subject to discoloration, surface cracking and other troubles as mentioned above.

As a method of making the surface difficult to contaminate, it is taught that an antistatic agent is added. This method shows, however, an effect to a certain extent for short time but cannot maintain the effect for a long time. Further, the addition of said additives might cause a degradation of the excellent characteristics of thermoplastic resin. Certain types of thermoplastic resins such as polycarbonate resin are used for armrests and air-conditioning window of railroad coaches or for sign-boards, but it is known that in the former case, the article tends to suffer from surface cracking, yellowing, staining, etc., and in the latter case, the article tends to be cracked due to deposition of gasoline, cleaner, etc.

For improving the chemical resistance of aromatic vinyl type thermoplastic resins, it has been proposed to copolymerize a polar monomer such as an acrylonitrile compound or to increase the amount of an acrylonitrile compound copolymerized. This method, however, is unsatisfactory in improving the chemical resistance of said resins. This method is also undesirable as it causes deterioration of moldability and heat stability of the resin and consequently causes discoloration of molded articles.

The disadvantages common to the aromatic vinyl type thermoplastic resins are that they are inflammable, that they are greatly deteriorated by ultraviolet rays, that they are easily worn, that the surface of their products tends to be contaminated, and that they are vulnerable to chemicals. Because of these disadvantages, the scope of use of said resins is limited.

Various methods for overcoming these disadvantages have been proposed. For instance, for affording flame retardancy to said resins, it is proposed to add a flame-retardant. However, the addition of a flame-retardant might spoil the molding flowability of the resin and the beautiful appearance of a molded article of the resin, and in the case of impact-resistant resin, its impact resistance will be greatly deteriorated, resulting in a loss of the original advantages of styrene resins. Addition of an urethane resin is also proposed for improving the wear resistance, but this involves the same problem as in the case of addition of a flame-retardant.

As viewed above, it is difficult to eliminate the disadvantages common to thermoplastic resins at the same time.

On the other hand, vinylidene fluoride resins have excellent molding flowability and is also excellent in weather resistance, chemical resistance, solvent resistance, wear resistance, heat resistance and flame retardancy, but these resins are expensive and this cost problem is a barrier to wider use of the resins.

It is ideal to obtain a resin which combines the advantages of both the thermoplastic resin and the vinylidene fluoride resin. As a method for obtaining a molded article possessing the advantages of the two types of resins, there occurs in mind a method of making a laminate of both the resins. However, the thermoplastic resin and the vinylidene fluoride resin have poor adhesiveness to each other, so that when the two resins are laminated, they tend to peel from each other, and therefore, it has been practically impossible to adopt this method.

As a result of extensive studies for improving adhesion between a thermoplastic resin layer and a vinylidene fluoride resin layer, the present inventors have found that the adhesion between the vinylidene fluoride resin and the thermoplastic resin can be appreciably improved by incorporating a specific amount of an ethylenic unsaturated carboxylic acid ester unit into the thermoplastic resin layer.

According to the present invention, there is provided a laminate consisting essentially of a layer of a thermoplastic resin (A) and a layer of a vinylidene fluoride resin (B), characterized in that the layer of the resin (A) contains polymerized units (C) of an ethylenic unsaturated carboxylic acid ester, the content of which is 3 to 80% by weight based on the weight of the layer of the resin (A).

The polymerized units (C) of the ethylenic unsaturated carboxylic acid ester may exist either as a copolymer constituent of the resin (A) or in the form of an ethylenic unsaturated carboxylic acid ester polymer (C') incorporated into the layer of the resin (A).

The thermoplastic resin (A) usable in this invention includes highly functional plastics generally called as engineering plastics, aromatic alkenyl type thermoplastic resins and chlorine-containing thermoplastic resins, and at least one resin selected from said types of resins may be used as the thermoplastic resin (A).

As the engineering plastics, there may be used at least one resin selected from the group consisting of polycarbonate resin, polyacetal resin, polyphenylene ether resin, polyamide resin, polyurethane resin and polyester resin, preferably at least one resin selected from polycarbonate resin, polyurethane resin and polyamide resin, and most preferably, polycarbonate resin is used.

It is possible to use a composition consisting of two or more different types of said resins, but since there are cases where the uniform mixing of such resins is difficult, it is preferred to use a single resin for allowing the resin to exhibit its innate properties to the fullest extent. Use of the polycarbonate resin is particularly preferred because the laminate using this resin shows an excellent interlaminar adhesion and also causes little deterioration of the innate properties of polycarbonate resin.

The polycarbonate suited for the purpose of this invention is a homopolycarbonate, a copolycarbonate or a mixture of different homopolycarbonates or different copolycarbonates.

The bound units in, for instance, an aromatic polycarbonate comprise, as the base, for instance, the following bisphenols: hydroquinone, resorcinol, hydroxybiphenyl, bis(hydroxyphenyl)alkane, bis(hydroxyphenyl)cycloalkane, bis(hydroxyphenyl)ether, bis(hydroxyphenyl)sulfide, bis(hydroxyphenyl)ketone, bis(hydroxyphenyl)sulfoxide, bis(hydroxyphenyl)sulfone, and α,α'-bis(hydroxyphenyl)diisopropylbenzene. Also, halogen-added bisphenols may be used. Among these bisphenols, the following are especially preferred: 2,2-bis(4-hydroxydiphenyl)propane, 2,4-bis(4-hydroxyphenyl) -2-methylbutane, 1,1-bis(4-hydroxyphenyl)-cyclohexane, α,α'-bis(4-hydroxyphenyl)-p-diisopropylbenzene, 2,2-bis(3,5-dichloro-4-hydroxyphenyl)propane, 2,2-bis(3,5-dibromo-4-hydroxyphenyl)propane, and 2,2-bis(3-chloro-4-hydroxyphenyl)propane.

Polyacetal resins include homopolymers and copolymers. A homopolymer can be obtained, for instance, by subjecting formamide to anionic polymerization at a low temperature. Such homopolymer is commercially available under the trade name of Delrin. A copolymer can be obtained, for instance, by subjecting trioxane and ethylene oxide to cationic polymerization. Such a copolymer is commercially available under the trade name of Duracon.

Polyphenylene ether resins usable in this invention include homopolymers and copolymers obtained, for example, by subjecting a phenol compound represented by the general formula:

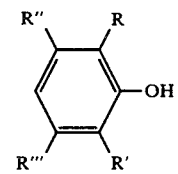

wherein R and R' are selected from hydrocarbon groups having 1 to 8 carbon atoms, and R" and R''' are selected from hydrocarbon groups having 1 to 8 carbon atoms and hydrogen atom, more specifically, 2,6-dimethylphenol or the like to oxidative coupling polymerization. They may be homopolymers or copolymers. It is also possible to use a polyphenylene ether resin in admixture with a styrene resin or in the form of a modified polyphenylene ether resin obtained by grafting a styrene monomer thereon.

Polyamide resins include Nylon 6, Nylon 66, Nylon 610, Nylon 11, Nylon 12 and their copolymers.

Polyurethane resins are the resinous polymers having urethane bond

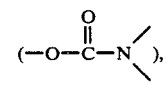

preferably those having a Rockwell hardness (ASTMD 785-62) R of 50 or above.

The polyester resin is preferably an aromatic polyester resin, and typical examples thereof include polyesters obtained from aromatic discarbonylic acids and dihydric alcohols such as polyethylene terephthalate, polypropylene terephthalate, polytetramethylene terephthalate, polypentamethylene terephthalate, polyhexamethylene terephthalate and the like, and polytetramethylene terephthalate and polyethylene terephthalate are particularly preferred.

Chlorine-containing thermoplastic resins usable in this invention include vinyl chloride resin, chlorinated vinyl chloride resin, ethylene-vinyl chloride copolymer, chlorinated polyethylene, vinyl chloride-vinyl acetate copolymer, vinylidene chloride resin, polychlorostyrene, and copolymers of chlorostyrene and other copolymerizable vinyl monomers or rubber-like polymers. Among them, vinyl chloride resin, ethylene-vinyl chloride copolymer and vinyl chloride-vinyl acetate copolymer are preferred.

Aromatic alkenyl type thermoplastic resin used as the resin (A) in this invention is a homopolymer of an aromatic alkenyl compound or a copolymer of an aromatic alkenyl compound and at least one other copolymerizable monomer. Examples of such copolymerizable monomers include ethylenic unsaturated carboxylic acid esters, alkenyl cyanide compounds and other ethylenic unsaturated compounds.

Aromatic alkenyl compounds include styrene, α-methylstyrene, p-methylstyrene, vinyltoluene, halogen-nucleus-substituted styrenes and the like.

The aromatic alkenyl compound contributes to the molding flowability of the aromatic alkenyl type thermoplastic resin. The content of the aromatic vinyl compound in the whole monomer is preferably 20% by weight or more. Good molding flowability is hardly obtainable if the content of said compound is less than 20% by weight.

The alkenyl cyanide compounds include acrylonitrile, methacrylonitrile and the like. In case of using such an alkenyl cyanide compound, its amount should be not more than 40% by weight, preferably 5 to 40% by weight, and more preferably 10 to 35% by weight, based on the weight of the whole monomer component of the thermoplastic resin (A). Use of this compound in an amount of more than 5% by weight can strengthen the adhesion to the vinylidene fluoride resin layer, but use of said compound in excess of 40% by weight results in a deterioration of moldability and heat stability of the thermoplastic resin (A); thus impairing the excellent innate properties of thermoplastic resin to reduce the industrial value of the product.

The ethylenic unsaturated carboxylic acid ester compounds include alkyl acrylates, alkyl methacrylates, and esters of ethylenic unsaturated carboxylic acids and hydroxyalkyls. Examples of alkyl acrylates are methyl acrylate, ethyl acrylate and the like. The alkyl methacrylates include methyl methacrylate, ethyl methacrylate and the like. The hydroxyalkyl esters of ethylenic unsaturated carboxylic acids include $\beta$-hydroxyethyl acrylate, $\beta$-hydroxyethyl methacrylate and the like. Alkyl methacrylates are preferred, and methyl methacrylate is most preferred.

The ethylenic unsaturated carboxylic acid ester compound in the copolymer serves as the polymerized unit (C) which is one of the essential components of this invention. The content of the polymerized unit of the ethylenic unsaturated carboxylic acid ester compound should be 3 to 80% by weight, more preferably 3 to 75% by weight, and most preferably 5 to 70% by weight, based on the weight of the copolymer, namely the thermoplastic resin (A). Use of this ethylenic unsaturated carboxylic acid ester compound in an amount of not less than 3% by weight can provide a laminate having an improved adhesion between the aromatic vinyl type thermoplastic resin molded article and the vinyldiene fluoride resin laminated thereon. However, if the content of said compound exceeds 80% by weight, good working flowability peculiar to the aromatic alkenyl type thermoplastic resin is impaired.

As said other copolymerizable monomer compounds, there may be used an alkenyl compound having an amide group, an N-methylol compound and an ethylenic unsaturated carboxylic acid. Examples of said alkenyl compound having an amide group or N-methylol compound are acrylamide, methacrylamide, N-methylolacrylamide and the like. Examples of the ethylenic unsaturated carboxylic acid are acrylic acid, methacrylic acid, fumaric acid, maleic acid, itaconic acid and the like.

The copolymerizable monomer compounds can be used either singly or in admixture of two or more. Polyfunctional monomers such as divinylbenzene can be also used as said copolymerizable monomer.

The method for preparing the aromatic alkenyl type thermoplastic resin of this invention is not critical, but such methods as emulsion polymerization, suspension polymerization, bulk suspension polymerization, bulk polymerization and solution polymerization can be used.

The aromatic alkenyl type thermoplastic resin of this invention can be markedly improved in impact strength by further incorporating a rubber-like polymer thereinto.

The rubber-like polymers usable for this purpose include diene rubber-like polymers and non-diene rubber-like polymers. Examples of the diene rubber-like polymers are polybutadiene, SBR, NBR, polyisoprene, polychloroprene and the like, and these polymers can be prepared by emulsion polymerization, solution polymerization or the like. They also include tin-, silicon- or lithium-coupled polybutadiene, polyisoprene, SBR, styrene-butadiene block copolymer and the like. These rubber-like polymers can be used either alone or in admixture of two or more.

Examples of the non-diene rubber-like polymers include ethylene-propylene copolymer, ethylene-propylene-non-conjugated diene copolymer, chlorinated polyethylene, isobutylene-isoprene rubber, acrylic rubber-like polymers, such as n-butyl acrylate polymer, copolymer of n-butyl acrylate and acrylonitrile, copolymer of n-butyl acrylate and butadiene, copolymer of n-butyl acrylate, butadiene and acrylonitrile, and the like. These non-diene rubber-like polymers can be used either alone or in admixture of two or more.

It is also possible to use a mixture of a diene rubber-like polymer and a non-diene rubber-like polymer.

The content of the rubber-like polymer in the aromatic alkenyl type thermoplastic resin is not more than 40% by weight. If it exceeds 40% by weight, the resulting composition lacks rigidity and is unsuited for application to the field where the performance of aromatic alkenyl type thermoplastic resin per se is required. In view of the balance between impact resistance and rigidity, the preferred range of said rubber-like polymer content is 5 to 40% by weight.

The ethylenic unsaturated carboxylic acid ester polymer (C') incorporated into the layer of the thermoplastic resin (A) in this invention is an acrylic resin obtained by polymerizing an ethylenic unsaturated carboxylic acid ester monomer or a mixture of such monomer and other copolymerizable monomer or monomers.

Examples of the ester compounds include alkyl acrylates, alkyl methacrylates, and hydroxyalkyl esters of ethylenic unsaturated carboxylic acids. Examples of the alkyl acrylates are methyl acrylate, ethyl acrylate and the like. Examples of the alkyl methacrylates are methyl methacrylate, ethyl methacrylate and the like. Examples of the hydroxyalkyl esters of ethylenic unsaturated carboxylic acids include $\beta$-hydroxyethyl acrylate, $\beta$-hydroxyethyl methacrylate and the like. Alkyl methacrylates are preferred, and methyl methacrylate is more preferable.

In this invention, the thermoplastic resin (A) containing the polymerized unit (C) of an ethylenic unsaturated carboxylic acid ester may be prepared by the following methods:

(1) copolymerizing an ethylenic unsaturated carboxylic acid ester with the monomeric constituent of the thermoplastic resin (A).

(2) blending a (co)polymer (C') of an ethylenic unsaturated carboxylic acid ester separately prepared with the thermoplastic resin (A).

The copolymerization in (1) above may be carried out by producing the thermoplastic resin (A) in the presence of an ethylenic unsaturated carboxylic acid ester. In particular, this is useful in the preparation of the chlorine-containing thermoplastic resin, the aromatic alkenyl type thermoplastic resin and the like as the thermoplastic resin (A).

Preferable examples of the aromatic alkenyl type thermoplastic resins of this invention are styrene-methyl acrylate copolymer, styrene-methyl methacrylate-acrylonitrile copolymer, diene rubber-styrene-methyl methacrylate copolymer, diene rubber-styrene-methyl methacrylate-acrylonitrile graft copolymer, non-diene rubber-styrene-methyl methacrylate graft copolymer and non-diene rubber-styrene-methyl methacrylate-acrylonitrile graft copolymer, which may be used alone or in admixture of two or more, and at least one of which may also be used in admixture of one or more other resins such as styrene-acrylonitrile copolymer, ABS resin, AES resin and the like.

In the case of blending the (co)polymer (C') with the thermoplastic resin (A), the (co)polymer (C') may be a homopolymer of an ethylenic unsaturated carboxylic acid ester or a copolymer of an ethylenic unsaturated carboxylic acid ester and other copolymerizable alkenyl monomer and/or rubber-like polymer. A blend of said homopolymer and said copolymer may also be used.

The monomers copolymerizable with the ethylenic unsaturated carboxylic acid esters include aromatic alkenyl compounds, alkenyl cyanide compounds, compounds having amide groups, polyfunctional compounds and the like. Preferred examples are styrene, α-methylstyrene and acrylonitrile.

Said ethylenic unsaturated carboxylic acid ester polymer (C') may be rubber-modified. Use of a rubber-modified acrylic resin can provide a laminate with even better impact resistance.

Rubber-like polymers usable for said rubber-modified ethylenic unsaturated carboxylic acid ester polymer include diene rubber-like polymers and non-diene rubber-like polymers. It is possible to use one or more of the rubber-like polymers used in said aromatic alkenyl type thermoplastic resin. Preferred examples of said rubber-like polymers are polybutadiene, SBR, EPDM, acrylic rubber and the like. EPDM and acrylic rubber are preferred for applications where weather resistance is required.

Preferred examples of the ethylenic unsaturated carboxylic acid ester (co)polymer (C') are polymethyl methacrylate and styrene-methyl methacrylate copolymer, styrene-acrylonitrile-methyl methacrylate copolymer, butadiene-styrene-methyl methacrylate graft copolymer, butadiene-styrene-acrylonitrile-methyl methacrylate graft copolymer and the like.

In case the ethylenic unsaturated carboxylic acid ester polymer (C') is a copolymer, that is, a copolymer of an ethylenic unsaturated carboxylic acid ester and other copolymerizable monomer and/or rubber-like polymer, the amount of the ethylenic unsaturated carboxylic acid ester contained in said polymer is preferably at least 20% by weight, more preferably at least 50% by weight, much more preferably at least 60% by weight, and most preferably at least 70% by weight. However, homopolymers are most preferable.

The content of the rubber-like polymer in the ethylenic unsaturated carboxylic acid ester (co)polymer (C') should be not more than 70% by weight. If it exceeds 70% by weight, the content of the ethylenic unsaturated carboxylic acid ester compound in said (co)polymer (C') becomes too small, and in case the thermoplastic resin (A) contains no polymerized unit (C) of an ethylenic unsaturated carboxylic acid ester in this case, no sufficient adhesion is provided between the resin (A) and the vinylidene fluoride resin (B) and there cannot be obtained a laminate which can stand practical use. The (co)polymer (C') may not contain any rubber-like polymer, but in case no rubber-like polymer is contained in the thermoplastic resin (A), it is preferable that the (co)polymer (C') contains a rubber-like polymer for acquiring a good balance between impact resistance and adhesive force. The rubber-like polymer content is preferably in the range of 5 to 40% by weight, more preferably 10 to 30% by weight. In the case where the copolymer (C') is incorporated into the thermoplastic resin (A), the polymerized units of an ethylenic unsaturated carboxylic acid ester must be present in an amount of 3 to 80% by weight of the weight of the layer of the thermoplastic resin (A).

The flow value of the (co)polymer (C') as measured by the Koka type flow tester is preferably 0.5–40 ($\times 10^{-3}$ cm$^3$/sec, 200° C. 30 kg/cm$^2$, nozzle; 1 mm$\phi \times 2$ mm). This range of flow values of said (co)polymer (C') provides a good compatibility of the (co)polymer (C') with the vinylidene fluoride resin (B), making it possible to obtain a laminate having an excellent mechanical strength.

The method of preparing the (co)polymer (C') is not critical, but such methods as emulsion polymerization, suspension polymerization, bulk suspension polymerization, bulk polymerization and solution polymerization can be preferably used.

The blending of the ethylenic unsaturated carboxylic acid ester (co)polymer (C') with the thermoplastic resin (A) is suitably applied to all the thermoplastic resins (A), and particularly preferred in the case where the thermoplastic resin (A) is difficult to form a copolymer with the ethylenic unsaturated carboxylic acid ester, for example, engineering plastics.

For blending uniformly the thermoplastic resin (A) with the (co)polymer (C') in this invention, the two are mixed in a Henschel mixer and the resulting mixture is hot-kneaded by means of an extruder or a Banbury mixer or on a roll.

The content of the polymerized units (C) of an ethylenic unsaturated carboxylic acid ester in the layer of the thermoplastic resin (A) is 3 to 80% by weight, preferably 3 to 70% by weight, more preferably 5 to 70% by weight, and most preferably 5 to 60% by weight, based on the weight of the layer of the resin (A). If the content is not less than 3% by weight, there is obtained a laminate having an improved adhesion between the thermoplastic resin layer and the vinylidene fluoride resin layer laminated thereon. However, if the content is more than 80% by weight, the good molding flowability of the thermoplastic resin (A) per se is impaired.

An improved method comprises adding a flowability-improver or lowering the molecular weight of the thermoplastic resin (A), but in the former case, a reduction of adhesion to the vinylidene fluoride resin is caused, while in the latter case, the heat stability at the time of working is reduced and partial decomposition of the resin is caused, whereby a gas is generated to impair the appearance of the molded article such as formation of silver streaks or discoloration of the molded article surface.

In the case where the thermoplastic resin is a polyamide resin, a polycarbonate resin, or a polyester resin, the (A)/(C) ratio by weight is preferably 30–80/70–20, more preferably 30–70/70–30. When the thermoplastic resin is a polyurethane resin or a chlorine-containing resin, the (A)/(C) ratio by weight may be 25-95/75-5, though it is preferably 25-85/75-15, more preferably 30-80/70-20. If the amount of the polymerized unit (C) of an ethylenic unsaturated carboxylic acid ester is too small, the adhesion between the layers is too low, and hence, it is not desirable. On the other hand, when the amount of the polymerized unit (A) exceeds 80% by weight, the excellent characteristics of the thermoplastic resin (A) per se are impaired, for example, when the resin (A) is a polycarbonate resin, a polyacetal resin or a polyphenylene ether resin, the heat resistance is impaired, and when the resin (A) is a polyamide resin the abrasion resistance and self-lublicity are impaired. When the resin (A) is a polyurethane, the abrasion resistance is impaired, and in the case of a chlorine-containing thermoplastic resin, the flame-retardancy is impaired.

The content of the polymerized units (C) of an ethylenic unsaturated carboxylic acid ester in the thermoplastic resin (A) is the total sum of (1) the units of ethylenic unsaturated carboxylic acid ester copolymerized with the thermoplastic resin (A) and (2) the units of ethylenic unsaturated carboxylic acid ester of a homopolymer or copolymer (C') of a ethylenic unsaturated carboxylic acid ester separately prepared and blended with the thermoplastic resin (A).

The vinylidene fluoride resins usable in this invention include not only homopolymer of vinylidene fluoride but also copolymers of 50% or more of vinylidene fluoride, preferably copolymers of 70% or more of vinylidene fluoride. A blend polymer of the hompolymer or copolymer of vinylidene fluoride with a (co)polymer of ethylenic unsaturated carboxylic acid ester (C') such as polymethacrylates, which is mentioned hereinbefore, in such an amount that the vinylidene fluoride content is 60% by weight or more, preferably at least 70% by weight, more preferably at least 75% by weight.

The monomers which can be copolymerized with the vinylidene fluoride are aromatic alkenyl compounds, ethylenic unsaturated carboxylic acid esters, alkenyl cyanide compounds and the like. Among them, the ethylenic unsaturated carboxylic acid esters mentioned as to the component (C') above are particularly preferred.

When the vinylidene fluoride resin (B) contains the polymerized unit (C) of an ethylenic unsaturated carboxylic acid ester, the adhesiveness between the layer of the resin (A) and the layer of the resin (B) can be improved. The content of the unit (C) in the resin (B) is not more than 40% by weight, preferably not more than 30% by weight, and in view of the adhesiveness, at least 2% by weight is preferred and at least 5% by weight is more preferable.

The method for laminating the layer of thermoplastic resin (A) and the layer of vinylidene fluoride resin (B) in this invention is not critical, but the following methods can be favorably used:

(1) Each of (A) and (B) is first subjected to an extruder or other molding means such as hot rolls to form a moled article (including sheet, film, etc.) and the molded article of (A) and (B) are put on each other in a not perfectly solidified state and press-bonded to obtain a laminate.

(2) Each of (A) and (B) is molded into a sheet or film by an extruder or a hot roll, and the sheets or films of (A) and (B) are put on each other and press-bonded with heating.

(3) On a sheet of (A) are put pellets or powder of (B), or on a sheet of (B) are put pellets or powder of (A), and the resulting assembly is compression-molded.

(4) (B) is dissolved in a proper solvent (such as dimethylformamide), then the resulting solution is applied on a molded article of (A) and the solvent is evaporated away to obtain a laminate, or (A) is dissolved in a proper solvent, then the resulting solution is applied on a sheet of (B) and the solvent is evaporated away to obtain a laminate.

In the case of laminating (B) on the molded article of (A), the vinylidene fluoride resin (B) can be laminated on at least one side of the molded article of (A), and the side to be laminated can be optionally decided according to the performance requirements in practical use. Also, in the laminate of this invention, a layer of the same thermoplastic resin as (A) free from the polymerized unit (C) may be further laminated on that side of the layer of (A) to which the layer of (B) is not bonded. To the side of the layer of (B) to which the layer of (A) is not bonded may be further laminated another layer of (B). For example, by laminating a transparent layer of a vinylidene fluoride resin (B) to the pigmented resin (B) layer laminated to the layer of the resin (A), not only is the effect of this invention obtained, but a sharp color and an excellent light resistance are also obtained.

The thickness of the laminate is not critical, and the laminate can be obtained in any thickness suited for the purpose of use. The thermoplastic resin (A) used in the laminate of this invention may be reinforced with glass fiber, metal fiber, carbon fiber, an organic filler or an inorganic filler such as calcium carbonate. Also, the layer of the thermoplastic resin (A) may be foamed.

A coloring matter having a high hiding power against light such as titanium dioxide, carbon black, etc., may be contained in the layer of the vinylidene fluoride resin (B) to minimize the deterioration of weather resistance of the laminate.

The laminate of this invention finds a wide variety of uses. Typical examples of its uses include signboards, material for suitcases, etc., in which use the property of the vinylidene fluoride resin layer to keep off soil proves beneficial, and various types of sashes, troughs, light-weight roofing, various kinds of signs such as road signs, billboards, etc., in which use the excellent weather resistance of the laminate proves advantageous. Also, by taking the advantage of strong resistance of the vinylidene fluoride resin layer to various kinds of chemicals the laminate can be used for storage containers of various chemicals.

In the production of the laminate of this invention, if necessary, a suitable additive or additives such as coloring matter, heat stabilizer, lubricant, plasticizer, ultraviolet absorber, antistatic agent, flame-retardant, etc. may be properly added in both or either of the thermoplastic resin (A) and the vinyl fluoride resin (B).

The present invention will be further described below referring to Examples, which are by way of illustration only. In the Examples, all "parts" and "%" are by weight unless otherwise specified.

EXAMPLES 1-9 AND COMPARATINVE EXAMPLES 1-4

I. Preparation of molded articles (A-1-A-13) of thermoplastic resins (A)

(1) Compounding recipe
Shown in Table 1.

(2) Molding method

The respective blends shown in Table 1 were melted and kneaded using a 6" φ roll kneader at 190° C. and press-molded at 210° C. by a press-molder to form square plates A-1–A-13 having a size of 150 mm×150 mm×1 mm (thickness)

II. Preparation molded articles (B-1 –B-3) of vinylidene fluoride resins (B)

(1) Type
B-1:polyvinylidene fluoride*
*natural pellets of KYNAR 740 (made by Pennwalt)
B-2:polyvinylidene fluoride/polymethyl methacrylate=80/20 (%)
B-3:polyvinyldiene fluoride/ABMS**=60/40 (%)
**resin of Note 3 under Table 1.

(2) Molding method

The above resins (B-1, B-2 and B-3) were respectively melted and kneaded by using a 6" φ roll kneader at 190° C. and press-molded at 210° C. to form square plates B-1, B-2 and B-3 having a size of 150 mm×150 mm×1 mm (thickness).

III. Method of laminating molded articles of thermoplastic resins (A) and molded articles of vinylidene fluiride resins (B) and laminate-evaluation method Using said molded articles (square plates A-1–A-13) of the thermoplastic resins (A) and the molded articles (square plates B-1-B-3) of the vinylidene fluoride resins (B), laminates were made with the combinations shown in Table 2 in the following way and these laminates were evaluated in the manner also shown below.

A plate of polyvinylidene fluoride resin (B) and a plate of the thermoplastic resin (A) were put on each other and press-molded at 210° C. by a press-molder to form an approximately 1.8-mm thick laminate.

(1) Determination of strength of adhesion

A 10 mm wide and 40 mm long strip-shaped test piece was cut out of each laminate and the strength of adhesion at the interface of the laminate was measured. The laminate layers were forcibly peeled along their interface by a length of about 5 mm from an end of the test piece in its longitudinal direction with a knife having a sharp edge.

The respective peeled layers were gripped with a suitable jig and pulled in the opposite directions vertically and the degree of adhesion at the interface was measured by using Autograph 1S-2000 (a registered trade mark for a tensile tester of Shimadzu Corporation).

(2) Heat shrinkage temperature

A 12.7 mm wide and 127 mm long strip-shaped test piece was cut out of the laminate. This test piece was left as it was heated in an air oven for one hour and, after conditioning it at room temperature for 24 hrs, the shrink along the longer side (127 mm) of the test piece was measured. The heating temperature was raised at a space of 5° C.

TABLE 1

Compounding recipe molded Article of thermoplastic resin (A)

| Component | Molded article No. | | | | | |
|---|---|---|---|---|---|---|
| | A-1 | A-2 | A-3 | A-4 | A-5 | A-6 |
| Polycarbonate resin[1] | 30 | 40 | 50 | 60 | 70 | 100 |
| Polymethyl methacrylate[2] | 70 | | 50 | 25 | 30 | |
| ABMS resin[3] | | 60 | | | | |
| ABS resin[4] | | | | 15 | | |
| Methyl methacrylate content in said resin (%) | 70 | 35.4 | 50 | 25 | 30 | 0 |

Note:
[1] 7022-A made by Mitsubishi Chemical Industries, Limited.
[2] GF-1000 made by Kyowa Gas Chemicals
[3] Methyl methacrylate/styrene/acrylonitrile/polybutadiene = 59/18/5/18(%) graft polymer
[4] styrene/acrylonitrile/polybutadiene =58/22/20(%) ABS resin

TABLE 2

Results of evaluation of laminates

| | Example 1 | Example 2 | Example 3 | Example 4 | Example 5 | Comp. Example 1 |
|---|---|---|---|---|---|---|
| Combination of resin layers in laminate Thermoplastic resin (A) layer | A-1 | A-2 | A-3 | A-4 | A-5 | A-6 |
| Polyvinylidene fluoride resin (B) layer | B-2 | B-1 | B-2 | B-3 | B-2 | B-1 |
| Methyl methacrylate content in thermoplastic resin (A) (%) | 70 | 35.4 | 50 | 25 | 30 | 0 |
| Methyl methacrylate content in polyvinylidene fluoride resin (B) (%) | 20 | 0 | 20 | 40 | 20 | 0 |
| Strength of adhesion (kg/cm) | Not peeled (above 5 kg/cm) | Same as left | Same as left | Same as left | 4.0 | Not bonded |
| Heat shrinkage temperature (°C.) | 100 | 100 | 105 | 110 | 115 | 125 |

TABLE 3

Compounding recipe of molded article of thermoplastic resin (A)

| Component | Molded article No. | | | | | | |
|---|---|---|---|---|---|---|---|
| | A-7 | A-8 | A-9 | A-10 | A-11 | A-12 | A-13 |
| Polyurethane resin[1] | 50 | 100 | | | | | |
| Polyamide resin[2] | | | 40 | 100 | | | |
| Polyethylene terephthalate[3] | | | | | 50 | 100 | |
| Polybutylene terephthalate[4] | | | | | | | 50 |
| ABMS resin[5] | 50 | | 50 | | 50 | | 50 |
| ABS resin[6] | | 10 | | | | | |
| Methyl methacrylate content in said | 29.5 | 0 | 29.5 | 0 | 29.5 | 0 | 29.5 |

TABLE 3-continued

| | Compounding recipe of molded article of thermoplastic resin (A) | | | | | | |
|---|---|---|---|---|---|---|---|
| | Molded article No. | | | | | | |
| Component | A-7 | A-8 | A-9 | A-10 | A-11 | A-12 | A-13 |
| resin (%) | | | | | | | |

Note:
[1] ELASTOLLAN E-574 FNAT made by Nippon Elastollan
[2] AMILAN CM-1017 made by Toray
[3] PET made by Teijin
[4] PBT 5010 made by Mitsubishi Kasei Kogyo
[5] resin of Note[3] in Table 1
[6] resin of Note[4] in Table 1

II. Preparation molded articles (B-1–B-3) of vinylidene fluoride resins (B)

(1) Type
Same as described before (B-1–B-3)
(2) Molding method
The above resins (B-1, B-2 and B-3) were respectively melted and kneaded at 180° C. using a 6" φ roll kneader and press-molded at 200° C. by a press-molder to form square flat plates B-1, B-2 and B-3 having a size of 15 cm×15 cm×1 mm (thickness)

III. Method of laminating molded articles of thermoplastic resins (A) and molded articles of vinylidene fluoride resins (B) and evaluation of adhesion Lamination of the thermoplastic resin (A) plates A-14–A-20 and the vinylidene fluoride resin (B) plates B-1–B-3 and the evaluation of the degree of adhesion of each laminate were conducted in the following manners:

The plate of the polyvinylidene fluoride resin (B) and the plate of the thermoplastic resin (A) were put on each other and press-molded at 180° C. using a press-molder to form an approximately 1.8 mm thick laminate. A 1 mm wide and 4 cm long strip-shaped test piece was cut out of each laminate and subjected to the same adhesion test as conducted in Example 1 described above.

TABLE 4

| | Results of evaluation of laminates | | | | | | |
|---|---|---|---|---|---|---|---|
| | Example 6 | Comp. Example 2 | Example 7 | Comp. Example 3 | Example 8 | Comp. Example 4 | Example 9 |
| Combination of resin layers in laminate Thermoplastic resin (A) layer | A-7 | A-8 | A-9 | A-10 | A-11 | A-12 | A-13 |
| Polyvinylidene fluoride resin (B) layer | B-2 | B-2 | B-2 | B-2 | B-2 | B-2 | B-2 |
| Methyl methacrylate polymer content in thermoplastic resin (A) (%) | 29.5 | 0 | 29.5 | 0 | 29.5 | 0 | 29.5 |
| Methyl methacrylate polymer content in polyvinylidene fluoride resin (B) (%) | 20 | 20 | 20 | 20 | 20 | 20 | 20 |
| Strength of adhesion (kg/cm) | Not peeled (above 5 kg/cm) | Not bonded | 4.0 | Not bonded | Not peeled | Not peeled | 3.5 |

EXAMPLES 10–14 AND COMPARATIVE EXAMPLES 5–7

I. Preparation of moded articles (A-14–A-20) of thermoplastic resins (A)

(1) Compounding recipe
Shown in Table 5
(2) Molding Method
The respective blends shown in Table 5 were melted and kneaded at 180° C. using a 6" φ roll kneader and press-molded by a press-molder at 180° C. to form square plates A-14–A-20 having a size of 15 cm×15 cm×1 mm (thickness).

TABLE 5

| | Compounding recipe of molded articles of thermoplastic resins (A) | | | | | | |
|---|---|---|---|---|---|---|---|
| | Molded article No. | | | | | | |
| Component | A-14 | A-15 | A-16 | A-17 | A-18 | A-19 | A-20 |
| Vinyl chloride resin (D.P. 1500) (parts) | 50 | 80 | 90 | | 60 | 100 | 15 |
| Vinyl chloride-vinyl acetate copolymer (D.P. 1500, vinyl acetate content 15%) (parts) | | | | 70 | | | |
| Polymethyl methacrylate[1] (parts) | 50 | | | | 25 | | 85 |
| Methyl methacrylate-styrene copolymer[2] (parts) | | | | 30 | | | |
| ABMS resin[3] (parts) | | 20 | 10 | | | | |
| ABS resin[4] (parts) | | | | | 15 | | |
| Tribasic lead sulfate (parts) | 1.5 | 1.5 | 1.5 | 1.5 | 1.5 | 1.5 | 1.5 |

TABLE 5-continued

| | Compounding recipe of molded articles of thermoplastic resins (A) | | | | | | |
|---|---|---|---|---|---|---|---|
| | Molded article No. | | | | | | |
| Component | A-14 | A-15 | A-16 | A-17 | A-18 | A-19 | A-20 |
| Dibasic lead stearate (parts) | 1.0 | 1.0 | 1.0 | 1.0 | 1.0 | 1.0 | 1.0 |
| Calcium stearate (parts) | 0.5 | 0.5 | 0.5 | 0.5 | 0.5 | 0.5 | 0.5 |
| Methyl methacrylate polymer content in said resin (%) | 50 | 11.8 | 5.9 | 16.5 | 25 | 0 | 85 |

Note:
[1] GF-1000 made by Kyowa Gas Chemicals
[2] methyl methacrylate/styrene = 55/45% copolymer
[3] methyl methacrylate/styrene/acrylonitrile/polybutadiene = 59/18/5/18(%) graft copolymer
[4] styrene/acrylonitrile/polybutadiene = 58/22/20(%) ABS resin Also, a 12.7 mm wide and 127 mm long test piece was cut out of each laminate and the test piece was subjected to a flammability test according to the Flammability Test Method Subject-94 defined by UL Laboratory.

Flammabilities of the respective layers of each laminate and degree of adhesion between the layers are shown in Table 6.

As seen from the test results, Examples 1 to 5 gave the laminates with an excellent strength of adhesion between the layers.

Comparative Example 5 concerns a laminate obtained by using the thermoplastic resin (A) containing no ethylenic unsaturated carboxylic acid ester polymer. The laminate layers were not bonded to each other.

Comparative Example 6 concerns a laminate formed by using the thermoplastic resin (A) containing methyl methacrylate polymer in an amount of 70% which exceeds the specified range of this invention. This laminate showed a degree of adhesion comparable with the laminates of the Examples of this invention, but the flammability test showed that this laminate was easier to burn and thus lower in flame retardancy than the laminates of the Examples of this invention.

Comparative Example 7 concerns a laminate made by using the polyvinylidene fluoride B-2 containing 10% of polymethyl methacrylate instead of B-1 in Comparative Example 1. This laminate showed a slightly better degree of adhesion than the laminate of Comparative Example 4 but was still unsatisfactory in adhesion.

weight) obtained by emulsion polymerization and 50% by weight of natural pellets of methyl methacrylate homopolymer (Parapet GF-1000 made by Kyowa Gas Chemicals) were melted and kneaded at 180° C. using a 6" φ roll kneader to form a styrene type thermoplastic resin A-21. This A-21 resin was press-molded at 200° C. by a press-molder to form a square plate having a size of 5 cm × 5 cm × 1 mm (thickness).

On the other hand, natural pellets of a polyvinylidene fluoride resin (B) (KYNAR 740 made by Pennwalt) were press-molded at 200° C. by a press-molder to form a square plate having a size of 5 cm × 5 mm × 1 mm (thickness). This polyvinylidene fluoride resin plate and the previously obtained styrene type thermoplastic resin plate were put on each other and press-molded at 200° C. by a pressmolder to obtain an approximately 1.8 mm thick laminate. A 1 mm wide and 4 cm long strip-shaped test piece was cut out of this laminate and subjected to the same adhesion test as conducted in Example 1. The results are shown in Table 7.

EXAMPLE 16

30% by weight of natural pellets of a styrene/acrylonitrile/methyl methacrylate/polybutadiene (18/5/59/18 by weight) copolymer resin obtained by emulsion polymerization and 70% by weight of natural pellets of an ABS resin (styrene/acrylonitrile/polybutadiene = 57/18/25 by weight) also obtained by emulsion polymerization were melted and kneaded at

TABLE 6

| Results of evaluation of laminate | | | | | | | | |
|---|---|---|---|---|---|---|---|---|
| | Example 10 | Example 11 | Example 12 | Example 13 | Example 14 | Comp. Example 5 | Comp. Example 6 | Comp. Example 7 |
| Combination of resin layers in laminate | A-14 | A-15 | A-16 | A-17 | A-18 | A-19 | A-20 | A-19 |
| Thermoplastic resin (A) layer | | | | | | | | |
| Polyvinylidene fluoride resin (B) layer | B-1 | B-2 | B-2 | B-2 | B-2 | B-1 | B-3 | B-2 |
| Methyl methacrylate polymer content in thermoplastic resin (A) (%) | 50 | 11.8 | 5.9 | 16.5 | 25 | 0 | 85 | 0 |
| Methyl methacrylate polymer content in polyvinylidene fluoride resin (B) (%) | 0 | 20 | 20 | 20 | 20 | 0 | 40 | 20 |
| Strength of adhesion (kg/cm) | Not peeled (over 5 kg/cm) | Same as left | Same as left | Same as left | Same as left | Not bonded | Not peeled (over 5 kg/cm) | 1.2 |
| Flammability (UL-94) | V-0 | V-0 | V-0 | V-0 | V-0 | V-0 | Burning | V-0 |

EXAMPLE 15

A styrene type thermoplastic resin (A) was prepared in the following way.

50% by weight of natural pellets of an ABS resin (styrene/acrylonitrile/polybutadiene = 57/18/25 by 180° C. using a 6" φ roll kneader to form a styrene type thermoplastic resin A-22, and using this A-22 resin, a laminate was made and its interface adhesion was measured and evaluated by the same procedure as in Example 15. The results are shown in Table 7.

EXAMPLE 17

The same procedure as in Example 16 was repeated, except that the styrene type thermoplastic resin (A) was replaced by a styrene-acrylonitrile-methyl methacrylate-polybutadiene copolymer resin, the weight ratio of the copolymer resin to the ABS resin was changed to 10/90, the styrene type thermoplastic resin was named as A-23, and the polyvinylidene fluoride resin (B) was replaced by a mixture of polyvinylidene fluoride (KYNAR 740) and polymethyl methacrylate in a mixing ratio of 90/10 by weight, to evaluate the degree of adhesion between the layers. The results are shown in Table 7.

COMPARATIVE EXAMPLE 8

The same procedure as in Example 15 was repeated, except that an ABS resin alone was substituted for the resin A-21, and the styrene type thermoplastic resin was named as A-24 to evaluate the degree of adhesion between the layers. The results are shown in Table 7.

COMPARATIVE EXAMPLE 9

The same procedure as in Example 15 was repeated, except that the thermoplastic resin A-21 was replaced by a composition of the styrene-acrylonitrile-methyl methacrylate-polybutadiene copolymer resin of Example 16 and the ABS resin of Example 15 in a mixing ratio of 2/98 by weight, which was named as A-25, to evaluate the degree of adhesion between the layers. The results are shown in Table 7.

The thermoplastic resin of Comparative Example 9 contained methyl methacrylate units in an amount of 1.6% which is lower than the specified range of this invention, and this resin was poor in adhesion to the polyvinylidene fluoride sheet.

EXAMPLES 18 and 19

Graft polymers (MBS resin and MABS resin) of the following compositions were prepared by emulsion polymerization and subjected to an adhesion test to KYNAR-740 according to the method of Example 15. The evaluation of physical properties of the individual resins was also conducted. The results are shown in Table 7.

MBS resin (A-26): polybutadiene/styrene/methyl methacrylate=24/56/20 by weight

MABS resin (A-27): polybutadiene/styrene/methyl methacrylate/acrylonitrile=24/36/25/15 by weight

TABLE 7

| | Examples | | | | | Comp. Examples | |
|---|---|---|---|---|---|---|---|
| | 15 | 16 | 17 | 18 | 19 | 8 | 9 |
| Thermoplastic resin | A-21 | A-22 | A-23 | A-26 | A-27 | A-24 | 25 |
| Polybutadiene (%) | 12.5 | 23.6 | 24.3 | 24 | 24 | 25 | 24.9 |
| Styrene | 28.5 | 49.2 | 53.1 | 56 | 36 | 57 | 56.2 |
| Methyl methacrylate | 50.0 | 11.8 | 5.9 | 20 | 25 | 0 | 1.2 |
| Acrylonitrile | 9.0 | 15.4 | 16.7 | — | 15 | 18 | 17.7 |
| Methyl methacrylate content (%) | 50 | 11.8 | 5.9 | 20 | 25 | 0 | 1.2 |
| Polyvinylidene fluoride content (%) | 100 | 100 | 90 | 100 | 100 | 100 | 100 |
| Properties of thermoplastic resin per se | | | | | | | |
| Molding flowability ($\times 10^{-3}$ cm$^3$/sec) | 23 | 14 | 1.5 | 17 | 15 | 18 | 16 |
| Izod impact strength (kg-cm/cm) | 18 | 38 | 36 | 35 | 33 | 41 | 38 |
| Strength of adhesion | 2.5 kg/cm | Not peeled | Same as left | Same as left | Same as left | Not bonded | Same as left |

What is claimed is:

1. A laminate consisting essentially of a layer of a thermoplastic resin (A) and a layer of a vinylidene fluoride resin (B), characterized in that the layer of the resin (A) contains polymerized units (C) of an ethylenic unsaturated carboxylic acid ester, the content of which is 3 to 80% by weight based on the weight of the layer of the resin (A).

2. A laminate according to claim 1, wherein the thermoplastic resin (A) is at least one member selected from the group consisting of engineering plastics, chlorine-containing thermoplastic resins and aromatic alkenyl type thermoplastic resins.

3. A laminate according to claim 2, wherein the engineering plastic is at least one resin selected from the group consisting of polycarbonate resin, polyacetal resin, polyphenylene ether resin, polyamide resin, polyurethane resin and polyester resin.

4. A laminate according to claim 1, wherein the chlorine-containing thermoplastic resin is a homopolymer or copolymer of vinyl chloride.

5. A laminate according to claim 2, wherein the chlorine-containing thermoplastic resin is at least one member selected from the group consisting of polyvinyl chloride, vinyl chloride-ethylene copolymer and vinyl chloride-vinyl acetate copolymer.

6. A laminate according to claim 2, wherein the aromatic alkenyl type thermoplastic resin is a homopolymer of an aromatic alkenyl compound or a copolymer of an aromatic alkenyl compound and at least one compound selected from the group consisting of ethylenic unsaturated carboxylic acid esters, ethylenic unsaturated carboxylic acids and alkenyl cyanide compounds.

7. A laminate according to claim 2, wherein the aromatic alkenyl type thermoplastic resin contains a rubber-like polymer.

8. A laminate according to claim 7, wherein the rubber-like polymer is at least one substance selected from the group consisting of conjugated diene rubbers and olefinic rubbers.

9. A laminate according to claim 1, wherein the vinylidene fluoride resin (B) is polyvinylidene fluoride or a copolymer containing 50% or more of vinylidene fluoride.

10. A laminate according to claim 1, wherein the ethylenic unsaturated carboxylic acid ester is at least one member selected from the group consisting of alkyl acrylates, alkyl methacrylates and hydroxyalkyl esters of ethylenic unsaturated carboxylic acids.

11. A laminate according to claim 1, wherein the ethylenic unsaturated carboxylic acid ester is an alkyl methacrylate.

12. A laminate according to claim 1, wherein the ethylenic unsaturated carboxylic acid ester is methyl methacrylate.

13. A laminate according to claim 1, wherein the content of polymerized units of an ethylenic unsaturated carboxylic acid ester in the layer of the resin (A) is 3 to 70% by weight.

14. A laminate according to claim 1, wherein the content of polymerized units of an ethylenic unsaturated carboxylic acid ester in the layer of the resin (A) is 5 to 70% by weight.

15. A laminate according to claim 1, wherein the content of polymerized units of an ethylenic unsaturated carboxylic acid ester in the layer of the resin (A) is 5 to 60% by weight.

16. A laminate according to claim 1, wherein the layer of the vinylidene fluoride resin (B) contains 2 to 40% by weight of polymerized units of an ethylenic unsaturated arboxylic acid ester.

17. A laminate according to claim 16, wherein an ethylenic unsaturated carboxylic acid ester polymer (C') is contained in the layer of the vinylidene fluoride resin (B).

18. A laminate according to claim 17, wherein the ethylenic unsaturated carboxylic acid ester polymer (C') is a homopolymer of an ethylenic unsaturated carboxylic acid ester; a copolymer of an ethylenic unsaturated carboxylic acid ester and at least one other copolymerizable vinyl monomer, at least one rubber-like polymer or both of them; or a blend of said homopolymer and said copolymer.

19. A laminate according to claim 1, wherein an ethylenic unsaturated carboxylic acid ester polymer (C') is contained in the layer of the thermoplastic resin (A).

20. A laminate according to claim 19, wherein the ethylenic unsaturated carboxylic acid ester polymer (C') is a homopolymer of an ethylenic unsaturated carboxylic acid ester; a copolymer of an ethylenic unsaturated carboxylic acid ester and at least one other copolymerizable vinyl monomer, at least one rubber-like polymer or both of them; or a blend of said homopolymer and said copolymer.

21. A laminate according to claim 20, wherein the ethylenic unsaturated carboxylic acid ester polymer (C') is polymethyl methacrylate.

* * * * *